US009395612B2

(12) United States Patent
Gapontsev et al.

(10) Patent No.: US 9,395,612 B2
(45) Date of Patent: Jul. 19, 2016

(54) HIGH POWER ULTRA-SHORT PULSE LASER-ILLUMINATED PROJECTOR

(71) Applicants: Valentin Gapontsev, Worcester, MA (US); Igor Samartsev, Oxford, MA (US); Alex Yusim, Boston, MA (US)

(72) Inventors: Valentin Gapontsev, Worcester, MA (US); Igor Samartsev, Oxford, MA (US); Alex Yusim, Boston, MA (US)

(73) Assignee: IPG PHOTONICS CORPORATION, Oxford, MA (US)

(*) Notice: Subject to any disclaimer, the term of this patent is extended or adjusted under 35 U.S.C. 154(b) by 317 days.

(21) Appl. No.: 14/199,548

(22) Filed: Mar. 6, 2014

(65) Prior Publication Data
US 2015/0219986 A1 Aug. 6, 2015

Related U.S. Application Data

(60) Provisional application No. 61/935,241, filed on Feb. 3, 2014.

(51) Int. Cl.
*G03B 21/20* (2006.01)
(52) U.S. Cl.
CPC .......... *G03B 21/2013* (2013.01); *G03B 21/204* (2013.01); *G03B 21/208* (2013.01); *G03B 21/2033* (2013.01)

(58) Field of Classification Search
CPC . G03B 21/2013; G03B 21/208; G03B 21/204
See application file for complete search history.

(56) References Cited

U.S. PATENT DOCUMENTS

| 7,826,500 | B2 * | 11/2010 | Mizuuchi | G02F 1/353 372/21 |
| 2008/0008431 | A1 * | 1/2008 | Shikii | G02F 1/365 385/115 |

* cited by examiner

*Primary Examiner* — Dung Nguyen
(74) *Attorney, Agent, or Firm* — Yuri Kateshov, Esq.; Timothy J. King, Esq.

(57) ABSTRACT

A laser illuminated projector system is configured with multiple Red, Green and Blue laser sources. The Green laser source has an all fiber master oscillator power amplifier configuration in which pump light is coupled into the output end of the fiber amplifier in a counter-propagation direction rendering the structure of the Green source and therefore projector system compact. The Green laser source is operative to emit signal light pulses at about 1064 nm wavelength with a pulse repetition reaching of up to about 3000 kHz, pulse duration between about a 100 fm to about 100 psec, an average power between 1.5 W to above 30 W, a peak power above 5 MW, a pulse energy exceeding 100 µJ and a beam quality parameter $M^2$ ranging between 1.2 and 1.5. The thus configured Green laser source substantially reduces speckle otherwise visible on the laser illuminated screen.

14 Claims, 2 Drawing Sheets

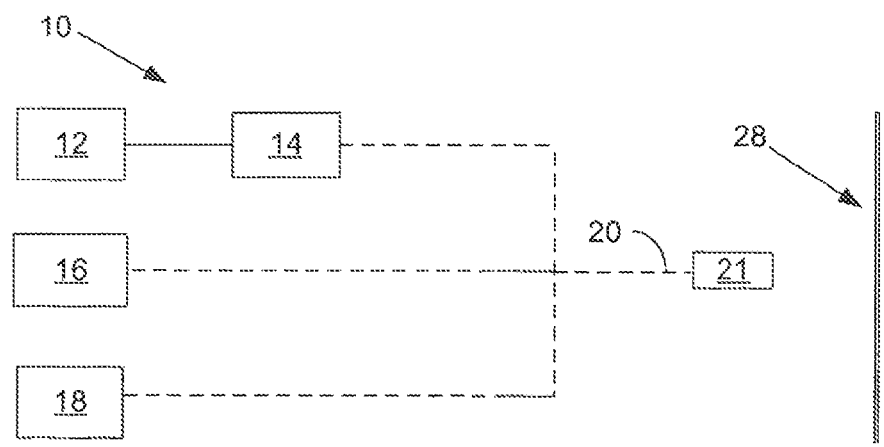
FIG. 1
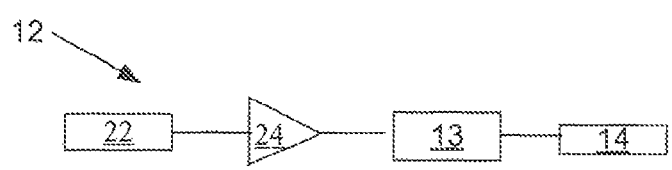
FIG. 2
FIG. 3
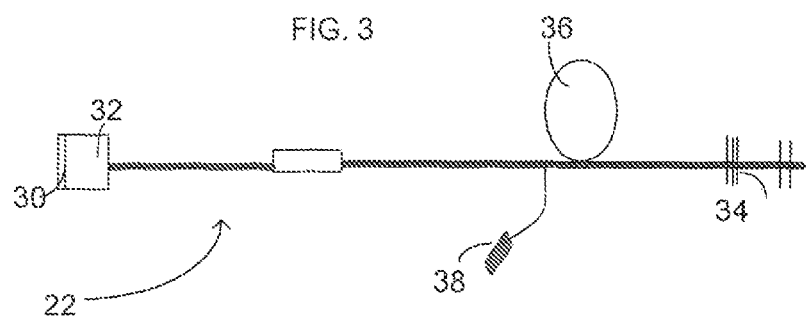
FIG. 4
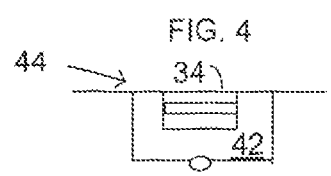

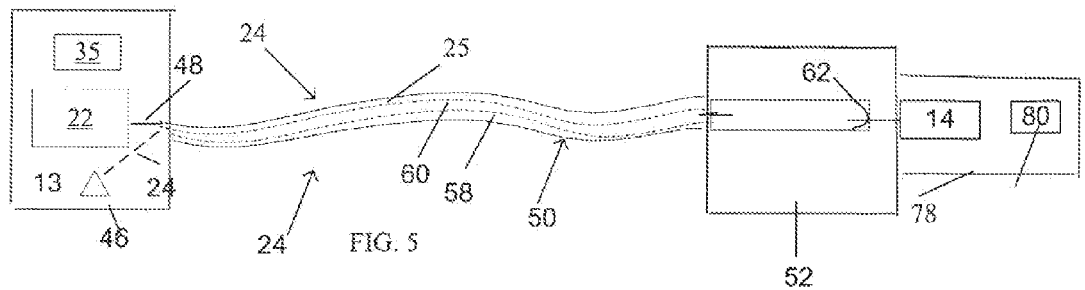
FIG. 5
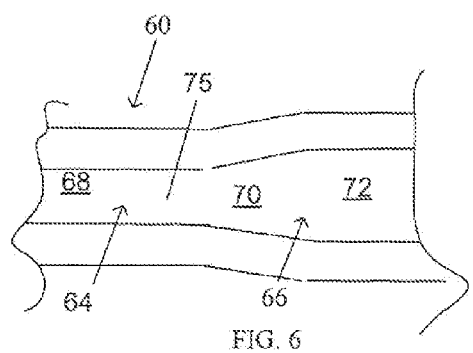
FIG. 6
FIG. 7
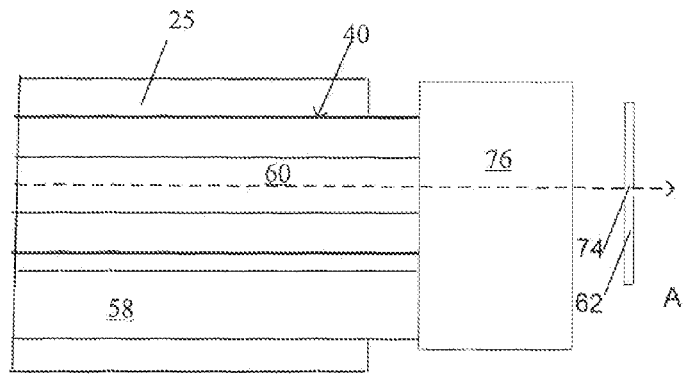

HIGH POWER ULTRA-SHORT PULSE LASER-ILLUMINATED PROJECTOR

CROSS-REFERENCE TO RELATED APPLICATION

This application relates to a U.S. provisional application entitled "HIGH POWER ULTRASHORT PULSED FIBER LASER" with both applications being simultaneously filed.

BACKGROUND OF THE DISCLOSURE

1. Field of the Disclosure

This disclosure relates to pulsed, broad-line fiber lasers. More particularly, the disclosure relates to pulsed broad-line fiber lasers for speckle reduction.

2. Prior Art

The advantages of using laser sources for the illumination of projection displays are compelling in comparison to using other light sources. They include: improved image brightness, improved power efficiency, improved image contrast, wider color gamut, reduced cost, reduced size of both the illumination source and the optical system, and improved depth of field for focus-free usage.

The main disadvantage of using laser sources is a potentially severe degradation of projected image quality due to the presence of a high contrast, high spatial frequency, granular pattern that seems to float at in front of the projected image plane. This pattern is known as speckle.

Since speckle arises due to the highly coherent nature of laser illumination, one means of improvement is to use sources with reduced coherence, such as the direct-emission green laser diodes. However, their linewidth is too narrow to reduce speckle to acceptable levels. Nor is the power of the most powerful laser diodes sufficient. The brightest and most power-efficient green lasers available today do not have sufficiently broad linewidth.

In recent years, the speckle suppression in laser projectors is often obtained by the use of a multimode fiber. The length of fiber should be long enough to achieve de-correlation of practically all fiber modes. The greatest advantage of this method is that it does not require mechanical movement. However, the correlation length of incident laser beam on screen increases by a factor equal to the magnification of the optical system. Therefore, to preserve the same speckle contrast on the screen as that at the distant fiber end, the method requires the number of multimode fibers be approximately equal to the square of the magnification of the projector objective lens (approximately equal to the number of pixels on the screen >300000). Despite significant efforts to develop a compact system for decreasing speckle noise to an acceptable for the human eye level, this problem still persists.

Hence there is a need for a fiber laser-illuminated projector system with reduced speckle noise that is of a simpler construction and more compact.

SUMMARY OF THE DISCLOSURE

In accordance with the disclosed subject matter, a fiber laser-based system is provided to overcome the above described and other deficiencies of the known prior art. In particular, the disclosed system has demonstrated the reduced speckle effect.

This is achieved through a combination of efficient, high-brightness, tunable red, green, and blue (RGB) pulsed laser system designed for high-performance digital projection systems. The result is a compact, all fiber light source that helps minimize a speckle effect, has low power consumption, provides saving on electricity as well as on heating, ventilation, and air-conditioning (HVAC) operating costs.

The disclosed laser system is characterized by high peak power and ultra-short pulses provided. Both these characteristics in combination provide efficient conversion of the fundamental frequency into the desired frequency of Green light. Individually, ultra-short pulses cause the broadening of linewidth of signal light at the fundamental frequency emitted from a seed source and, therefore, speckle reduction.

BRIEF DESCRIPTION OF THE DRAWINGS

The features and advantages of the disclosed system will become more readily apparent from the following description accompanied by the drawings, in which:

FIG. 1 is a laser-based projection configuration of the disclosed system.

FIG. 2 is an optical schematic of the disclosed high power, ultra-short pulse fiber laser system;

FIG. 3 is an exemplary optical schematic of a seed source;

FIG. 4 is an exemplary view of a pulse stretcher,

FIG. 5 is an exemplary optical schematic of the fiber laser system of FIG. 2;

FIG. 6 is a diagrammatic view of the downstream end of the booster of the laser system illustrated in FIG. 5; and FIG. 7 is a diagrammatic view of the laser head of the laser system shown in FIG. 5.

SPECIFIC DESCRIPTION

Reference will now be made in detail to the preferred embodiments of the disclosure. Wherever possible, same or similar reference numerals are used in the drawings and the description to refer to the same or like parts or steps. The drawings are in very simplified form and are not precise to scale.

The disclosed laser-illuminated projector 10 is configured as a compact assembly due to a compact Green pulsed laser fiber source with a single-pass frequency doubling conversion scheme. The compactness of the Green laser source is a result of an all fiber master oscillator power amplifier ("MOPA") configuration in which a booster amplifier is end-pumped in a counter-propagating direction. The system 10 is efficient and its high-brightness, tunable red, green, and blue (RGB) laser technology is configured to output ultra-short pulses with pulse duration in a femtosecond to picosecond range and linewidth between about 0.5 to several nanometers. The result is a compact light source that substantially minimizes the appearance of speckles, has a long lifetime, and low power consumption, saving on electricity as well as heating, ventilation, and air-conditioning operating costs.

FIG. 1 illustrates a general exemplary schematic of disclosed laser-illuminated projector system 10. The system 10 is configured with three laser light sources 12, 16 and 18 emitting respective green, red and blue signal beams and together constituting a laser source assembly. The signal beams are guided via respective bulk focusing optic over free space or output passive fibers 20 and can be combined in the known to one of ordinary skill manner in a Red Green Blue ("RGB") projector head 21 illuminating a screen 23.

Referring to FIG. 2, green laser light source 12 has an all fiber configuration which considerably reduces the overall dimensions the laser source assembly by comparison with other known laser source assemblies used in cinema. Configured as a MOPA, source 12 thus includes a seed 22 emitting short pulses of light in a 1 µm wavelength range. The pulses are further amplified in a high power fiber booster stage 24 and finally compressed to the desired duration by means of a volume Bragg grating 13. Utilizing a single pass frequency doubling scheme 14 with a non-linear crystal, such as lithium triborate ("LBO") crystal or any other suitable crystal known to one of ordinary skill, the signal light at a fundamental frequency is converted to Green light at the desired frequency.

Turning now to FIG. 3, seed 22 may have a variety of optical geometries well known to one of ordinary skill in the art and depending on whether a passive mode locking technique or active mode locking technique is used. For example, as shown in FIG. 3, the passive mode-locking of seed 22 is achieved with a saturable absorber mirror ("SESAM").

The SESAM can be used to mode-lock a wide range of laser cavities. Pulses result from the phase-locking (via the loss mechanism of the saturable absorber) of the multiple lasing modes supported in continuous-wave laser operation. The absorber becomes saturated at high intensities, thus allowing the majority of the cavity energy to pass through the absorber to a Bragg-mirror 30, where it is reflected back into the laser cavity limited on the weak side by a fiber Bragg grating 38. At low intensities, the absorber is not saturated, and absorbs all incident energy, effectively removing it from the laser cavity resulting of suppression of possible Q-switched mode-locking.

The Bragg-mirror 30 is mounted on a semiconductor wafer 32 like GaAs, covered by an absorber layer and a top film system, determining the absorption. Although semiconductor saturable absorber mirrors have been employed for mode-locking in a wide variety of laser cavities, the SAM has to be designed for each specific application. The differing loss, gain spectrum, internal cavity power, etc., of each laser necessitates slightly different absorber characteristics. An active fiber 36 in the seed laser cavity is doped with ions of rare earth elements, such as Ytterbium, and pumped by light emitted from a pump 38, which may include diode lasers or fiber lasers which pump active fiber 36 in the known manner, in the desired wavelength range around a 975 nm center wavelength.

In order to extract more energy by the ultrashort pulses from the amplifier a method called chirped pulse amplification is used. One method to stretch the pulses in the disclosed monolithic package is to use a linearly chirped fiber Bragg grating ("FBG")/broadband reflector 34. The FBG 34 can be designed to stretch pulses up to 1000 psec or longer from 0.1 psec or shorter into a femtosecond region. The linearly chirped FBG 34 is particularly advantageous for fast switching.

Referring to FIG. 4 in combination with FIG. 3, the adjustment of the pulse duration in real time is realized by a tunable pulse stretcher 44 that uses mechanical flexure mount 42 that holds linearly chirped FBG 34. The piezo is located in position to optimize the stretching of the FBG about a flexure point. In contrast to the known piezo-based structures, having a limited displacement which necessitates the use of a non-linearly chirped FBG for limited pulse duration adjustment, piezo mount 42 induces a much larger changes in the length of FBG 34 held in mount 42. These changes over the range of piezo operation permit the use of a linearly chirped FBG to tune the pulse duration from 0.5 psec to 5 psec and with obvious to one of ordinary skill in the laser arts modifications this range can be extended even further from 500 fs to 30 psec with switching time as short as microseconds. The switching frequency of pulse stretcher 34 generally depends on two factors: operational frequency of a piezo element which reaches a MHz level and material of mount 42. Thus selecting the material that meets given requirements, pulse stretcher 44 is capable of operating in a switching frequency range between KHz and hundreds KHz. Accordingly, if a need arises to change pulse duration between adjacent pulses, pulse stretcher 44 can satisfy this need. It should be noted, that pulse stretcher 44 as disclosed above can be used in any chirped pulsed amplification laser system.

Turning to FIG. 5 in combination with FIG. 2, the overall layout of Green laser system includes a main console 46 housing seed 22, one or more pump sources 13, optional pre-amplifying cascade(s), electronics, cooling systems, power feed supply for the seed laser and pump sources, and all other necessary components cumulatively denoted as 35.

The SM signal light emitted by seed laser 22 is coupled into a SM passive output fiber 48 delivering the SM signal light to an active fiber 60 of the fiber booster with a double clad configuration which surrounds a MM core. The active fiber 60 traverses a flexible delivery cable 50 extending over free space between main console 46 and a laser head 52. The MM core of active fiber 60 is doped with one or more light emitters, such as ions of ytterbium ("Yb"). One or more passive multimode pump light output fibers 58 extend over free space between console 46 and laser head 52 within cable 50. The output SM passive fiber 48 of seed source 22 is spliced to active fiber 60 within cable 50.

Turning briefly to FIG. 6, active fiber 60 may be configured with separately manufactured uniformly dimensioned fiber 64 and bottleneck-shaped fiber rod 66 fused together, but is preferably manufactured as a monolithic, continuous one piece structure. The signal light is amplified to the desired level reaching MW peak power levels, if necessary, as it is emitted from booster stage 24 with an $M^2$ beam quality parameter of the emitted signal light varying between 1.1 and 1.5.

The MM core 75 of active fiber 60 is configured with at least three regions: an input uniformly dimensioned region 68, a frustoconical mode transforming region 70 and output amplifying region 72. The excitation of only the fundamental mode in doped MM core 75 is realized by initially matching a mode field diameter ("MFD") of the fundamental mode of MM core 75 with that of output passive fiber 48 (FIG. 5) of the seed laser. Accordingly, signal light coupled into active fiber 60 of booster stage 24 excites substantially only a fundamental mode. The latter further adiabatically expands as it is guided through transforming region 70 and amplified in amplifying region 72.

Referring to FIGS. 5 and 7, laser head 52 houses a reflective element 62 such as a mirror. An opening 74 provided in mirror 62 and centered on the optical axis of system 10, is dimensioned to prevent or minimize signal light losses in the propagating direction A. Preferably, opening 74 has a diameter twice as large as a beam diameter, but may be somewhat larger, for example, thrice the diameter of the beam waist. The diameter of mirror 62 is substantially the same as a distance between the downstream facet of active fiber 60 and opening 74. The mirror 62 is configured to redirect pump light emitted from pump fiber(s) 58 back into the output end of active fiber 60 in the counter-propagating direction, as discussed in greater detail below.

The laser head 52 further also houses buffer 76 having its input fused to the output end of all fibers 60 and 58. The buffer 76 may be configured as a silica-glass coreless rod and operative to prevent the damage to fiber ends due to the reduced power density of the output beam propagating through the volume of buffer 76. The remotely positioned and easily displaceable laser head 52 eases the deployment of the Green laser system. However, laser head 52 may be installed within the main console.

The pump light delivery fiber 58 is configured as a passive MM fiber. Preferably, a downstream end region of pump fiber 58 extends parallel to the output region 40 of active fiber 60. The output ends of respective fibers 58 and 60 may be directly bonded to the upstream face of buffer 76 along the propagation direction A. Other spatial relationships between these two fibers are also within the scope of the disclosure. For example one of the delivery and active fibers can be bonded to the upstream face of the buffer at an angle relative to the optical axis of the other. More than a single delivery fiber can be used in combination with active fiber 60.

The disclosed Yb fiber laser including seed 22 and booster 24 operates at an average power varying between 1.5 W to above 30 W and a peak power above 5 MW. The pulse energy may exceed 100 µJ and be as low as 5 µJ. The beam quality ranges between 1.2 and 1.5. The pulse duration covers a 100 fs to 100 psec interval, and a pulse repetition rate can reach 3000 kHz and higher.

Referring to FIGS. 1, 2 and 5, laser head 52 may be configured with an extension 78 housing a compressor 13 (FIG. 2) configured as a volume Bragg grating which is operative to reduce the pulse duration to its original duration before the latter is frequency doubled in second harmonic generator scheme 14 to output Green light in a 515-545 nm wavelength range which by means of bulk optics delivered to the RGB projector head.

The generated ultra-short Green light pulses are characterized by an ultra-high peak power that may potentially threaten the entire Green light module integrity because of backreflection from screen 28 (FIG. 1). To prevent such a possibility, system 10 incorporates anther volume Bragg grating 80 (FIG. 5) at the wavelength of Green light to stretch pulses reflected from screen 20 lowering high peak powers of the backreflected light.

The Blue and Red laser light sources may be configured as diode lasers. Alternatively, nonlinear effects such as a sum-frequency scheme incorporating the disclosed Yb laser can be used to generate the desired color.

Although the present disclosure has been described in terms of the disclosed example, numerous modifications and/or additions to the above-disclosed embodiments would be readily apparent to one skilled in the laser arts without departing however from the scope and spirit of the following claims.

The invention claimed is:

1. A laser illuminated projector system, comprising:
multiple laser sources emitting Red, Green and Blue ("RGB") light beams, the Green laser source having a master oscillator/power amplifier ("MOPA") structure including:
 a fiber seed laser operative to emit sub-nanosecond pulses of single mode ("SM") signal light at a fundamental frequency in a propagating direction along a light path,
 a fiber booster provided with a light-emitter-doped multimode core ("MM") which has a bottleneck-shaped cross-section expanding toward a downstream thereof and receiving pulses of the SM signal light, and
 a reflective element located downstream from the fiber booster and configured to receive and reflect pump light into the downstream of the MM core in a counter-propagating direction, wherein the MM core is configured to emit sub-nanosecond pulses of amplified signal light at the fundamental frequency in substantially a fundamental mode, and
 a single pass second harmonic generator ("SHG") receiving the pulses of amplified signal light and configured to double the fundamental frequency so as to generate sub-nanosecond pulses of Green light; and
an RGB projector head configured to receive the RGB beams.

2. The laser-illuminated projector system of claim 1, wherein the Green laser source is operative to emit signal light pulses at about 1064 nm wavelength with a pulse repetition reaching of up to about 3000 kHz, each pulse having duration between about a 100 f to about 100 psec, an average power between 1.5 W to above 30 W, a peak power above 5 MW, a pulse energy exceeding 100 µJ and a beam quality parameter $M^2$ ranging between 1.2 and 1.5.

3. The laser-illuminated projector system of claim 1, wherein the fiber booster includes a uniformly dimensioned relatively long upstream fiber section and a relatively short downstream fiber rod section terminating upstream from the SHG, the MM core extending through an entire length of the fiber booster and having an upstream uniformly dimensioned portion which co-extends with the fiber section and receives the SM signal light from the seed laser, an adiabatically expanding mode transforming portion and uniformly shaped amplifying portion which has a larger cross-section than that of the upstream portion, the amplifying portion of the MM fiber extending through the fiber rod part section of the fiber booster.

4. The laser-illuminated projector system of claim 3, wherein the fiber portion of the MM core is dimensioned so that the SM signal light from the fiber seed laser excites only the fundamental mode upon coupling into the fiber booster, the mode transforming portion of the MM core being configured to adiabatically expand the fundamental mode without excitation of high order modes.

5. The laser illuminated projector system of claim 3, wherein the fiber booster has a monolithic splice-less structure or includes the fiber and fiber rod sections spliced to one another.

6. The laser illuminated projector system of claim 3, wherein the Green laser source further includes:
a pump source configured to output the pump light at a pump wavelength shorter than a wavelength of the signal light from the seed laser and provided with at least one or more MM passive pump light delivery fibers;
a flexible cable dimensioned to be traversed by the fiber booster and pump light delivery lights and terminating upstream from the SHG;
a silica-made buffer located upstream from the reflective element and having an upstream face which is fused to output ends of respective fiber booster and pump delivery fiber.

7. The laser illuminated projector system of claim 6 further comprising:
a portable laser head housing the silica-made buffer, reflective element and SHG, and
a main console housing the seed laser and pump source, the flexible cable extending over free space between the main console and laser head.

8. The laser illuminated projector system of claim 7 further comprising a first chirped upstream volume Bragg grating located in the laser head between the reflective element and SHG and configured to compress pulses of the signal light at the fundamental frequency.

9. The laser illuminated projector system of claim 7 further comprising a second chirped volume Bragg grating configured to stretch Green light pulses which are backreflected in the counter-propagation direction downstream from the laser head at the doubled frequency.

10. The laser illuminated projector system of claim 1, wherein the seed laser is configured with a fiber laser cavity which is defined between a semiconductor saturable absorber and a weak fiber Bragg grating ("FBG").

11. The laser illuminated projector system of claim 10, wherein the seed laser includes a linearly chirped FBG within the cavity operative to stretch pulses of the signal light.

12. The laser illuminated projector system of claim 11, wherein the seed laser further includes a piezo actuator mounted to a holder, the holder being configured to support the chirped FBG and operative to linearly and arcuately stretch the FBG in response to a signal from the piezo actuator.

13. The laser illuminated projector system of claim 12, wherein the holder is configured to stretch the chirped FBG to a desired length so as to adjust a pulse duration within a pulse train.

14. The laser illuminated projector system of claim 4, wherein the seed laser includes an output passive SM fiber spliced to the upstream fiber section of the fiber booster, a core of the output passive SM fiber and upstream portion of the MM core being configured to support respective single and fundamental modes having which have matching mode field diameters, respectively.

* * * * *